United States Patent
Skilling et al.

(10) Patent No.: US 8,694,317 B2
(45) Date of Patent: Apr. 8, 2014

(54) METHODS AND APPARATUS RELATING TO SEARCHING OF SPOKEN AUDIO DATA

(75) Inventors: Adrian I Skilling, Malvern (GB); Howard A K Wright, Malvern (GB)

(73) Assignee: Aurix Limited, Malvern, Worcestershire (GB)

( * ) Notice: Subject to any disclaimer, the term of this patent is extended or adjusted under 35 U.S.C. 154(b) by 1718 days.

(21) Appl. No.: 11/347,313

(22) Filed: Feb. 6, 2006

(65) Prior Publication Data

US 2006/0206324 A1  Sep. 14, 2006

Related U.S. Application Data

(60) Provisional application No. 60/650,140, filed on Feb. 7, 2005.

(30) Foreign Application Priority Data

Feb. 5, 2005 (EP) .................................... 05002472

(51) Int. Cl.
*G10L 15/00* (2013.01)
*G10L 15/14* (2006.01)
*G10L 15/06* (2013.01)
*G10L 21/00* (2013.01)

(52) U.S. Cl.
USPC ........... 704/254; 704/231; 704/235; 704/236; 704/237; 704/238; 704/240; 704/251; 704/252; 704/255; 704/256.5; 704/275

(58) Field of Classification Search
CPC ......... G10L 15/00; G10L 15/04; G10L 15/08; G10L 15/10; G10L 15/12; G10L 15/265; G10L 15/187; G10L 15/26; G06F 17/30026; G06F 17/3074; G06F 17/30743

USPC ........................................ 704/243, 231–256.8
See application file for complete search history.

(56) References Cited

U.S. PATENT DOCUMENTS

| | | | | |
|---|---|---|---|---|
| 5,390,278 A | * | 2/1995 | Gupta et al. | 704/243 |
| 5,884,259 A | * | 3/1999 | Bahl et al. | 704/252 |
| 5,893,058 A | * | 4/1999 | Kosaka | 704/254 |

(Continued)

OTHER PUBLICATIONS

European Communication dated May 10, 2006 for EP 06250588.8.

(Continued)

*Primary Examiner* — Paras D Shah
(74) *Attorney, Agent, or Firm* — John Maldjian, Esq.; Alexander D. Walter, Esq.; Kacvinsky Daisak Bluni PLLC

(57) ABSTRACT

Methods for processing audio data containing speech to produce a searchable index file and for subsequently searching such an index file are provided. The processing method uses a phonetic approach and models each frame of the audio data with a set of reference phones. A score for each of the reference phones, representing the difference of the audio from the phone model, is stored in the searchable data file for each of the phones in the reference set. A consequence of storing information regarding each of the reference phones is that the accuracy of searches carried out on the index file is not compromised by the rejection of information about particular phones. A subsequent search method is also provided which uses a simple and efficient dynamic programming search to locate instances of a search term in the audio. The methods of the present invention have particular application to the field of audio data mining.

16 Claims, 2 Drawing Sheets

(56) References Cited

U.S. PATENT DOCUMENTS

| | | | |
|---|---|---|---|
| 5,960,395 A * | 9/1999 | Tzirkel-Hancock | 704/241 |
| 6,006,181 A * | 12/1999 | Buhrke et al. | 704/231 |
| 6,073,095 A * | 6/2000 | Dharanipragada et al. | 704/242 |
| 6,224,636 B1 * | 5/2001 | Wegmann et al. | 704/246 |
| 6,377,921 B1 * | 4/2002 | Bahl et al. | 704/243 |
| 6,442,520 B1 * | 8/2002 | Buhrke et al. | 704/255 |
| 6,618,702 B1 * | 9/2003 | Kohler et al. | 704/250 |
| 6,675,143 B1 * | 1/2004 | Barnes et al. | 704/257 |
| 6,873,993 B2 * | 3/2005 | Charlesworth et al. | 707/102 |
| 6,985,861 B2 * | 1/2006 | Van Thong et al. | 704/254 |
| 6,990,448 B2 * | 1/2006 | Charlesworth et al. | 704/243 |
| 7,177,795 B1 * | 2/2007 | Chen et al. | 704/9 |
| 7,212,968 B1 * | 5/2007 | Garner et al. | 704/251 |
| 7,263,484 B1 * | 8/2007 | Cardillo et al. | 704/236 |
| 7,310,600 B1 * | 12/2007 | Garner et al. | 704/234 |
| 7,392,187 B2 * | 6/2008 | Bejar et al. | 704/243 |
| 7,401,019 B2 * | 7/2008 | Seide et al. | 704/254 |
| 7,725,319 B2 * | 5/2010 | Aronowitz | 704/253 |
| 7,904,296 B2 * | 3/2011 | Morris | 704/254 |
| 2002/0022960 A1 * | 2/2002 | Charlesworth et al. | 704/251 |
| 2003/0177108 A1 * | 9/2003 | Charlesworth et al. | 707/1 |
| 2004/0073423 A1 * | 4/2004 | Freedman | 704/235 |
| 2004/0193412 A1 * | 9/2004 | Baker | 704/240 |
| 2004/0210443 A1 * | 10/2004 | Kuhn et al. | 704/276 |
| 2005/0010412 A1 * | 1/2005 | Aronowitz | 704/254 |
| 2006/0116997 A1 * | 6/2006 | Yu et al. | 707/4 |
| 2007/0038450 A1 * | 2/2007 | Josifovski | 704/255 |
| 2007/0208561 A1 * | 9/2007 | Choi et al. | 704/231 |

OTHER PUBLICATIONS

EP Search Report of EP 05 00 2472, filed Jun. 28, 2005.
Foote et al., "Unconstrained keyword spotting using phone lattices with application to spoken document retrieval", Computer Speech and Language, vol. 11, No. 3, Jul. 1997, pp. 207-224, XP004418786.
Seide et al., "Vocabulary-independent search in spontaneous speech", 2004 IEEE International Conference on Acoustics, Speech, and Signal Processing, vol. 1, May 17, 2004, pp. 253-256, XP002333530.
Gelin et al., "Keyword spotting for multimedia document indexing", Multimedia storage and archiving systems II, vol. 3229, Nov. 3, 1997, pp. 366-377, XP002333531.
James et al., "A fast lattice-based approach to vocabulary independent wordspotting", Database accession No. 4916146, 1994.
Kadambe et al., "Language identification with phonological and lexical models", 1995 International Conference on Acoustics, Speech, and Signal Processing, ICASSP-95, vol. 5, May 9, 1995, pp. 3507-3510, XP010152103.
Politis et al., "An audio signatures indexing scheme for dynamic content multimedia databases", $10^{th}$ Mediterranean Electrotechnical Conference, 2000, vol. 2, May 29, 2000, pp. 725-728, XP010517893.
Clements et al., "Phonetic Searching of Digital Audio", International Journal of Speech Technology, Aug. 4, 2002, XP002977606.
Dharanipragada et al., "A multistage algorithm for spotting new words in speech", IEEE Transactions on Speech and Audio Processing IEEE, vol. 10, No. 8, Nov. 2002, pp. 542-550, XP002333533.
Tucker et al., "Speech-As-Data Technologies for Personal Information Devices", HPL-2002-42, 2002.
Moreau et al., "Phone-based Spoken Document Retrieval in Conformance with the MPEG-7 Standard", AES $25^{th}$ International Conference, Jun. 17-19, 2004.
Ng et al., "Phonetic Recognition for Spoken Document Retrieval", 1998.
Clements et al., Phonetic Searching vs. LVCSR: How to find what you really want in Audio Archives, 2002.

* cited by examiner

METHODS AND APPARATUS RELATING TO SEARCHING OF SPOKEN AUDIO DATA

This application claims benefit of U.S. Provisional Application No. 60/650,140, filed 7 Feb. 2005, and priority of EP 05002472.8, 5 Feb. 2005, the entire contents of each of which are incorporated herein by reference.

FIELD OF THE INVENTION

This invention relates to methods and apparatus for searching audio data for spoken words and phrases, for processing audio data for subsequent searching and for searching processed audio data.

BACKGROUND OF THE INVENTION

Increasingly data is being stored electronically and there is a growing need to be able to quickly and accurately search such electronic data. For electronic data which represents textual information searching can be relatively easy. However for audio data containing speech interrogating the data to find specific spoken words is not so easy.

Speech recognition technology has been applied to the searching of audio information and various approaches have been proposed.

One approach, termed word spotting, processes the audio data after the search term has been defined to determine whether or not that particular search term occurs in the audio. Whilst this approach does allow searching for any search term it requires processing of each and every audio data file each time a search is performed. This can limit the speed of searching and is computationally very expensive in terms of processing power.

An alternative approach is to process the audio data file once and create a metadata file which can be linked to the audio data. This metadata can then be searched quickly to locate a desired search term.

The usual approach to creating the metadata is to create a transcript of the audio file using a large vocabulary speech recogniser. Whilst very fast searching is possible—the metadata file representing a textual transcript can be searched in the usual fashion—there are limitations with this approach. For instance the large vocabulary speech recogniser makes hard choices when producing the transcript which can lead to errors therein. For example, in English, the phrase "a grey day" is usually indistinguishable acoustically from "a grade A". A speech recogniser acting on such an audio input will ultimately decide on one option, using contextual and grammatical clues as appropriate. If the wrong option is chosen the transcript will contain an error and a search on the metadata for the correct search term cannot generate a hit.

Also large vocabulary speech recognisers are inherently limited by their vocabulary database in that they can only identify sound patterns for words they have previously been programmed with. Therefore when audio data is processed the resulting metadata transcript file can only contain words which the recogniser had knowledge of at the time of processing. Thus where an audio data file contains a spoken word that the recogniser has no knowledge of (i.e. is not in the recogniser's dictionary), for instance the name of a new product or company or the name of a person, the metadata transcript will not contain that word and again a search for that term can never generate a hit. This is especially an issue for searching data archives of news organisations etc. and, although the database of words the speech recogniser has available can be updated, the audio data files processed before the update will be limited by the database at the time the metadata was created. To incorporate the new words the audio would have to be re-processed, which is a time consuming task.

A more recent approach has retained phonetic information when creating a metadata file for searching—see for example K. Ng and V. Zue, "Phonetic Recognition for Spoken Document Retrieval," Proceedings of IEEE International Conference on Acoustics, Speech and Signal Processing, Seattle, USA, pp. 325-328, 1998. In this approach the speech recogniser does not attempt to identify words in the audio file but instead represents the phonetic content of the audio file. The metadata file then consists of a representation of the identified phones in the audio file.

This approach offers more flexibility in that, in effect, the metadata file represents the identified sounds in the speech and the speech recogniser has not made any hard decisions about what words these sounds correspond to. The concept of a word is only realised at search time, when an input search term (e.g. a text string representing one or more words) is converted into a phone sequence and a search performed on the metadata file to identify instances of that phone sequence. This approach does require more processing during searching than the large vocabulary based transcription approach but avoids problems such as the "grade A" vs. "grey day" choice. The vocabulary of such phonetic systems is therefore not limited by a dictionary of known words that is used at pre-processing time and is only limited by the database of phones which can be identified—which is generally unchanging in a given language. Searches for words recently added to the dictionary can be carried out without the need to re-process the audio. The search can identify all instances of similar sound patterns allowing the user to quickly verify whether the identified speech is of relevance.

If the speech recogniser is configured to simply output the most likely sequence of phones for a given section of speech this sequence is likely to contain many phone recognition errors. Any such errors will lower the search accuracy of the system and may require the use of additional search techniques as a means of compensating for the likely recognition errors.

There exists a known technique that addresses these problems by storing a lattice representing multiple possible phone matches in the index file, rather than just storing information regarding the most likely phone sequence a piece of spoken audio represents—D. A. James and S. J. Young, "A Fast Lattice-Based Approach to Vocabulary Independent Word-spotting", Proceedings of IEEE International Conference on Acoustics, Speech and Signal Processing, Adelaide, Australia, Vol. 1, pp 377-380, 1994. Other lattice based approaches are described in:

Foote J. T. et al, "Unconstrained keyword spotting using phone lattices with application to spoken document retrieval", Computer Speech and Language, Academic Press London, vol. 11, no. 3, July 1997, pp 207-224, Seide F. et al, "Vocabulary-independent search in spontaneous speech", 2004 IEEE International Conference on Acoustics, Speech and Signal Processing, Vol. 1, 17 May 2004, pp 253-256, and Gelin P. et al, "Keyword spotting for multimedia document indexing", Multimedia Storage and Archiving Systems II, Vol. 3229, 3 Nov. 1997, pp 366-377.

A lattice comprises a series of nodes each representing a point in time during the utterance. The nodes are connected by different pathways, each pathway representing different possible phones/phone sequences. The lattice file stores the N most likely phones/phone sequences between nodes, i.e. a series of pathways of the lattice. Thus the lattice file contains an indication of possible phones at different times in the speech between the start and end node and the connectivity between the possible phones. The choice of N, i.e. how many different hypotheses to store, sometimes referred to as the depth of the lattice, results in a choice between considerations of accuracy, storage and computational load. A lattice with a high depth has more possible hypotheses available, and hence the potential for improved accuracy, but has a much higher storage content, especially as a modest increase in depth can increase the number of possible pathways significantly. This also makes searching a high depth lattice much more computationally intensive.

BRIEF SUMMARY OF THE INVENTION

It is an object of the invention to provide methods of processing audio files to produce searchable metadata and to provide methods of searching such data that maintain the advantages of the phonetic approach whilst overcoming the limitations of both the simple phone transcription and phonetic lattice approaches.

Thus according to a first aspect of the present invention there is provided a method of processing audio data to provide a searchable data file comprising the step of analysing the audio data with a phonetic recogniser wherein the phonetic recogniser acts on frames of the audio data and determines, for each frame, a score for each of a set of reference phones, the score being indicative of the likelihood that said frame corresponds to said phone characterised in that the score for each of the reference phones for each frame is stored in the searchable data file.

The present invention therefore employs a phonetic based approach to providing a searchable data file. A phonetic recogniser is provided with models that represent a set of reference phones, i.e. details of the distinct component sounds that make speech. The phonetic recogniser analyses frames of audio data using the model for each reference phone and determines how likely it is that the particular frame contains that particular phone. As the skilled person will understand a frame of audio data is a short segment of the audio input. The respective scores calculated for each of the phones in the reference set for each audio frame processed are then stored in the searchable data file.

Therefore the method of the present invention does not make a decision regarding which phone or set of N most likely phones a particular audio frame represents, and therefore does not simply produce a phonetic transcript of the audio data or even a phonetic lattice. Instead the present invention creates a data file which contains the score for each phone in the set of reference phones for each audio frame. Thus the method of the present invention does not make any hard choices regarding the phones contained in the audio data. The searchable data file retains detailed model matching information representing all possible phone matches for each audio frame, and this allows more accurate searching later.

Furthermore as the data file used by the method contains a score for each of the, say, p reference phones for each of the, say, f audio frames the data has a simple p by f matrix format. By matrix format it is meant a format where the location of a score in the data file gives the possible phone and audio frame to which it applies and there is no data stored relating to any hypothesis of connectivity between the possible phones at different times. This has important advantages. A simple data structure allows simple and fast searching to be performed. The data file is also suitable for compression. Obviously the exact way the data is stored will depend on the particular file format used and any compression algorithms applied but the term matrix is used to refer to the principle of the structure of the data file.

When it is wished to search the searchable data file a search word or phrase is converted into one or more phonetic sequences, i.e. sequences of reference phones, which are then searched for in the searchable data file. These phonetic sequences represent the likely phonetic pronunciations of the search word/phrase. However, instead of looking for occurrences of the particular phone sequence in the searchable data file, where this data file contains the recognised phones including any errors (in the simple phonetic approach) or the possible sequences of phones (in the lattice approach), the search of the searchable data file produced by the present invention looks for the most likely instances of the search sequence occurring in the data file on the basis of the scores for each phone at each point in the audio.

The method of the present invention is advantageous in that it does not reject any possibilities on initial processing, i.e. on creation of the searchable data file, and so is less likely to miss instances of the search term. For example imagine some audio data contains a single instance of a particular word. If a conventional phonetic recogniser mis-identifies any of the phones that make up that word then the searched for phone sequence will not appear in the searchable data file. Therefore any error in identifying the correct phones will impact on the accuracy of the system. This may be compensated for, to a certain extent, by allowing for a certain number of errors—for instance only eight out of ten phones in the sequence may have to match or the search may automatically look for alternative sequences with similar phonetic content. However, allowing for too many errors will increase the false hit rate and the only way to sort hits will be by the number of correct phones.

The method of the present invention differs from a conventional phonetic recogniser method which only stores the most likely phone or the N best hypotheses in a phone lattice in that a measure of the degree of confidence in all of the reference phones is preserved for all frames. Therefore, even though the phonetic recogniser may not always assign the best score to the correct phone (comparable to an error in phone determination for standard phone recognition), the score for the correct phone will be retained. Therefore when searching for the search term the phonetic sequence sought will still be found in the data file and should have a score that indicates it is a likely match. Furthermore the method of the present invention will inherently give a degree of confidence in each identified sequence, with the consequence that hits can be easily sorted according to confidence.

Therefore, especially with regard to searching for longer phrases, the method of the present invention provides a searchable data file which can be more accurately searched than is possible with known phonetic based approaches. At the same time, like known phonetic based approaches, the method of the present invention is not limited by a database of words and allows free searching.

It will of course be noted that the searchable data file contains information about all possible phones for each audio frame and so could be a larger file than that produced using known phonetic based approaches. Therefore searching the data file produced by the present invention may involve searching more data than with known phonetic approaches. However as mentioned previously the lattice approach produces a relatively complex data file as the individual pathways between the start and end nodes are stored which requires information to be retained about which phone possibilities may follow any particular phone postulate on any given pathway. For phone lattices of limited depth the complexity is relatively low as only a few pathways are permitted—but equally a lot of phone hypotheses will have been discarded, with resulting impact on search accuracy. For phone lattices of high depth there is a great deal of complexity which will increase storage requirements and also require complicated and less efficient searching techniques. Any additional data storage requirement for implementing the present invention will not be large. Searching is still possible at high speed, especially as the method of the present invention provides a searchable data file with a simple structure that can therefore exploit a more simple and efficient search than is possible with known phonetic approaches which do not retain information about each of the phones in the reference set at all points in time. For example, a metadata file can be searched many thousands of times faster than real time (one hour's worth of audio searched in less than a second). Indeed a digital audio data file (e.g. a file from an existing archive of audio data) can be processed and a searchable data file produced, using the method of the present invention, several times faster than real time. This means that the method of the present invention could operate in effective real time on live audio feeds to create the data files, which may be useful for recording searchable files of telephone calls or statements etc. or for the automatic cataloguing of news feeds. The skilled person will of course appreciate that for real time operation a certain duration of the audio stream may be recorded prior to processing, for example one minute's worth. The recorded minute is then processed whilst the next minute of audio is being recorded. For the purposes of this specification such processing shall be taken to be real time processing.

It should also be noted that the searchable data need not be stored as a separate searchable file to be accessed later. For several applications the searchable data may well be stored as an index file, for instance as metadata to an audio clip which is being stored. For real time processing however the searchable data may, additionally or alternatively, be output directly as a data stream to an apparatus running a query or to a different apparatus for eventually storage. Therefore the term searchable data file as used herein is not limited to files stored in a computer readable format on some kind of storage medium but can also include a constant data stream output which can be searched or stored by some other apparatus.

Note as used herein the term phonetic recogniser shall be taken to mean any hardware or software implementation of a means for acting on an audio data file so as to identify the likelihood scores of the phones in the data. Speech recognisers are often based on phonetic recognition and various different phonetic models exist. The present invention could be implemented using any suitable phonetic models or suitable recogniser provided that individual scores for the likelihood of the occurrence of each reference phone can be determined for each frame in the audio file (e.g. every $1/100^{th}$ of a second). Standard recognisers would not however automatically seek to compute and output a score for each phone model as it is not useful and potentially diverts processing resources from the recogniser's actual purpose. The skilled person would readily be able to implement a phonetic recogniser which did output a score for each phone model.

Typically, the phonetic recogniser will use hidden Markov models (HMMs) to determine the likelihood scores of the phones in the audio. HMMs representing each phone will contain features that relate to the spectral content of the sound associated with that phone. A single phone may be represented by more than one HMM, in order to model effects due to phone context and/or to model known sequences of sounds that occur for a single phone. Durational characteristics of the phone are also modelled. The phonetic recogniser may analyse short sections of audio, usually called frames (typically at a rate of 100 frames per second), and calculate the required spectral features for the audio and compare the values for these features with the values in each of the HMMs. Likelihoods are calculated for each HMM. In practice, it is convenient to store distances representing the differences between the spectral features of the audio and the features in the models. Distance scores represent how similar/dissimilar a particular portion of audio is to an HMM. The distance is a single value calculated using all of the model features that typically relate to the frequency content of the signal and it is these distances which form the scores for the phones. If a single phone is represented by multiple HMMs (for example to model context effects or sequences of sounds), scores are produced for all of the HMMs.

The scores may be recorded to a predetermined accuracy, for instance the scores could be rounded and stored as integers to save storage space. In one implementation of the present method the scores were stored as integers between 0 and 255. It is possible therefore that at any given time at least one phone in the reference set is given a score indicating that a match to the given frame is highly unlikely—however this is still a score and information regarding the score for that phone is still stored in the searchable data file.

Note as used herein the term audio data refers to any audio which contains at least some speech whether it be live speech, speech broadcast over any broadcast medium or stored in any format. It includes any data which may provide information in addition to the audio data, for instance video data with integrated audio or other audio-visual information etc. The term audio data file refers to a file, whether stored digitally or otherwise, which represents an audio track having at least some speech and includes audio-visual information. When not stored in digital format the audio file is generally converted into a digital representation prior to analysis by the phonetic recogniser.

The set of reference phones used may be the complete set of phones used in any given language or dialect. For instance the reference set of phones may be all the phones that comprise spoken British English, including regional variations. English generally comprises about 44 phonemes (depending on accent and regional variations).

The reference set of phones could comprise a sub-set of a larger database of phones, for instance a database comprising the phones from a number of different languages and/or dialects. The reference phone set could be pre-selected by an operator who checks the audio file to determine the language/dialect and therefore the corresponding reference phone set. Alternatively the method could involve use of a language recogniser to identify the language/dialect being spoken in the audio file and automatically select an appropriate sub-set of phones as the reference phone set. The phonetic recogniser may be configured to also act as the language recogniser prior to performing the phonetic analysis or a separate language recogniser may be used.

Alternatively the reference phone set could comprise the totality of phones from a number of different languages. For instance a reference phone set comprising all phones from a large number of languages could effectively be language independent across those languages. A few hundred phones could comprise a generally language independent phone set. With an appropriate reference phone set the method of the present invention would not therefore require any prior knowledge of the language of the audio data before processing. The searchable data file produced by the present invention would contain the scores for each of the phones in the language independent reference phone set. The method of the present invention would therefore be able to provide a searchable data file for audio data which includes speech in more than one language.

The phonetic recogniser conveniently compares the audio data to a model of each phone in the reference data set and outputs a score as a distance of the audio for that frame from the model. The recogniser generally analyses each frame independently, i.e. the score for a particular phone is based solely on how closely that audio segment matches the model for that phone.

The searchable data file may also contain other information regarding the audio data. For instance the searchable data file may contain information identifying the position in the audio data of a frame to which a set of phone scores relates so as to allow retrieval of the relevant part of the audio data containing a match to the search sequence. Conveniently, where the phonetic recogniser analyses the audio data by frames, the searchable data file will indicate which frame each of the set of phone scores corresponds to. In other words for each phone distance score in the searchable data file there is a time reference in the audio. Therefore a search of the searchable data file may identify frames of the audio data that correspond to the search word or phrase and allow for the relevant portion of the audio data to be played.

Additionally or alternatively information that can be used to identify a particular speaker could be included in the searchable data file. For instance features that are derived from the audio and that could be used, together with models of known speakers, to discriminate between speakers could be calculated and stored in the metadata file. These features would be calculated for each frame of the audio and stored along with an appropriate time reference (e.g. a frame number). This would avoid making hard decisions about which frames of audio are spoken by which speaker at processing time, but would allow searches to be performed for words or phrases spoken by specific individuals.

The searchable data file could also include any other information defined by a user, for instance whether the audio data is an audio-visual data file or an audio only file, what type of file it is, for instance for cataloguing news files there could be categories for studio based news presentation, outside broadcasts, interviews etc. to allow for further refining of subsequent searching.

Other information which it may be advantageous to store includes the name of the audio file, the total length of the audio, the sample rate of the audio and the recogniser configuration used to generate the index file. The recogniser configuration may be defined by a language or standard reference phone set, e.g. British English, US English, etc. and speech type, e.g. broadcast, telephone etc.

As mentioned previously the search of the searchable data file produced by the method of the first aspect of the present invention is not just a simple search for any instances of the phonetic sequence corresponding to the search term.

Therefore in a second aspect of the present invention there is provided a method of searching audio data for a phonetic search sequence comprising the steps of (i) taking a searchable data file having a score for each of a set of reference phones for each of a series of frames of the audio data, the scores being indicative of the likelihood that that particular frame corresponds to that particular phone, and (ii) searching said searchable data file to find likely matches to the phonetic search sequence wherein the scores for the reference phones for each frame are used to determine the likely matches.

The method of the second aspect of the present invention therefore takes a searchable data file such as produced according to the first aspect of the invention and uses the scores determined for each of the reference phones for each audio frame to determine the likely matches for the phonetic search sequence. Looking at the scores stored in the searchable data file for the relevant reference phones for a sequence of audio frames will give an indication of the likelihood of a match with the phonetic search sequence.

Conveniently the step of searching for likely matches using the scores for the reference phones comprises the step of using a dynamic programming (DP) search. Dynamic programming is a well established technique used in a variety of pattern matching applications. It provides a computationally efficient way to align two sequences of arbitrary length in a way that applies the optimum non-linear timescale distortion to achieve the best match at all points. In speech recognition it is commonly used as a way to determine the best alignment of a sequence of audio/spectral features with a sequence of HMMs. The DP process is therefore used as an efficient way to determine the likely sequences of phones or words given a section of audio and a set of HMMs. The skilled person would therefore be aware of how to implement or adapt a DP search algorithm to identify likely matches to a defined phonetic search sequence based on the scores for the reference phones.

The method of searching according to this aspect of the invention is advantageous in terms of simplicity and accuracy as compared with known phonetic based approaches because, as mentioned above, the searchable data file produced by the method of the first aspect of the invention comprises a score for each of a set of reference phones for each audio frame. The structure of the searchable data file is therefore a simple structure, in effect it is a matrix of the scores for each of the possible phones for each audio segment or frame. Unlike lattice based approaches no assumptions about connectivity between different phones are included and there are no imposed pathways to complicate the data structure or search process. This allows for a relatively simple and efficient DP search to be performed on the searchable data file which will generate all possible matches.

Known phonetic based approaches to producing a searchable data file have produced a lattice of the N most likely phone sequences. Such a data file does not contain information about all possible phones and therefore were such a DP search to be applied to searching the data file it would need to try and compensate for the missing information, for instance by inventing scores for the missing phones. This results in a set of phone scores that are compromised by the failure to store all of the phone data at recognition time, and the DP search results can no longer be guaranteed to be optimal.

The paper by Gelin et al ("Keyword spotting for multimedia document indexing") highlights this problem and comments that "not all phonemic hypotheses appear in the lattice . . . Thus a blocking effect may result in the search strategy". It goes on to discuss the technique of using estimated phone confusion probabilities "to alleviate this blocking effect".

With the lattice approach, the problem of missing phonetic information cannot be overcome by simply extending the lattice depth (value of N) to the maximum value because even then, in any practical system the resulting lattice will never contain information about all phones at each audio frame. In addition, a lattice based searchable data file will need to take the structural information into account resulting in a much more complex, and hence slower, DP search, especially when the value of N increases.

Alternative techniques to DP searching can be used with the lattice approach. However these have disadvantages because, in order to deal with the missing phone information, it is usual to apply some other non-optimal search techniques (such as allowing one phone in the sequence to be missing or allowing the presence of an acoustically similar phone in the search) which increase search complexity and potentially reduce accuracy.

Whereas in some instances the phonetic search sequence may be known, the method conveniently comprises the step of determining the phonetic search sequence or sequences that correspond to pronunciations of the defined search terms. Typically a user may enter a search term corresponding to a word or phrase to search for as text and a processor will convert the search term into one or more phonetic search sequences. The processor preferably uses letter-to-sound trees and/or phonetic dictionaries to create the one or more search phonetic sequences. Where a word or letter combination has more than one possible pronunciation or has a different dialect pronunciation the processor may determine a separate phonetic search sequence for each pronunciation. Each sequence could be searched for separately but usually the different pronunciations have at least some phones in common and so all possible pronunciations are represented as a network of phones. In this way the different pronunciations share common phone sequences. The processor may be provided with a speech synthesiser to replay the phonetic search sequence to the user to confirm the acceptability of the phonetic search sequence.

In some instances the search term may be supplied as audio data in which case the method may comprise using a phonetic speech recogniser to determine the phonetic search sequence. For instance a user may speak a search term into a phonetic speech recogniser or an audio data file containing the speech to be searched for could be supplied.

The method may include the step of searching for other data in the searchable data file to limit the search, for instance information regarding the identity of the speaker or the type of audio data.

The search also indicates the relative position in the audio file of any likely matches. Conveniently the search outputs the position of each match in the audio file by its start and end times.

The present invention lies partly in providing a phonetic index file to an audio data file containing speech to allow for subsequent searching. In another aspect of the invention therefore there is provided a searchable audio data file comprising an audio file and a phonetic index file, the phonetic index file corresponding to a series of frames representing all of the audio data and comprising for each frame a score for each of a set of reference phones. Each score is indicative of the likelihood that a particular audio frame relates to that particular phone. The audio file contains data allowing the reproduction of the audio and may conveniently comprise digital audio data. The phonetic index file preferably also comprises information regarding the relative location in the audio file of at least some of the audio frames to which the particular scores relate.

The methods of the first and second aspects of the present invention may conveniently be implemented using a computer and can be performed satisfactorily using standard personal computers. Therefore in another aspect of the invention there is provided a computer program for implementing the method of creating a searchable data file according to the first aspect of the invention. The invention also provides a computer program for implementing the method of searching a searchable data file according to the second aspect of the invention. The invention also extends to a computer programmed to carry out the method of creating a searchable data file and/or searching a searchable data file and to a computer program on a machine readable storage medium.

In another aspect the present invention provides an apparatus for acting on audio data to create a searchable data file comprising a reference set of phones, a phonetic recogniser adapted to compare a frame of audio data with the reference set of phones and to output a score indicative of the likelihood that said frame corresponds to each phone, and a data storage means for creating a searchable data file comprising, for each frame of the audio data, the score for each of the set of reference phones. Thus this aspect of the present invention effectively provides an apparatus for performing the method of the first aspect of the invention. As such all the advantages of the first aspect of the invention apply to the apparatus and all the embodiments thereof can be implemented in the apparatus.

The first aspect of the present invention produces a searchable data file which contains information about the scores for each of the set of reference phones. Keeping information about all possible phones for all audio frames avoids any assumptions being made and therefore allows for very accurate searching later. The data for all phones can be searched efficiently due to the simple data structure used. Thus another aspect of the invention relates to a searchable data file containing scores about all possible phones in spoken audio which has a simple structure.

Therefore according to another aspect of the invention there is provided a method of processing audio data to provide a searchable data file comprising the step of analysing the audio data with a phonetic recogniser wherein the phonetic recogniser acts on frames of the audio data and determines, for each frame, a score for a plurality of reference phones, the score being indicative of the likelihood that said frame corresponds to said phone characterised in that the searchable data file stores scores for each said audio frame in a simple matrix format.

Again the term matrix format is not used to specify that the scores must be stored in rows and columns in the data file but instead means that the scores are stored for each audio frame and there is no data stored relating to any link between the score of one frame and any other frame.

Preferably in this aspect of the invention the plurality of phone scores determined are the scores for each of a set of reference phones and each of these phone scores is stored in the searchable data file. However, for some particular applications, where storage is a significant issue, it may be wished to reduce the size of the searchable data file. Therefore, in this aspect of the invention, the searchable data file may store only the N best scores. As mentioned previously this will involve rejecting some data with a possible loss of accuracy. However it can result in a reduction of the size of the data file with an acceptable loss in accuracy. This aspect of the present invention still has advantage over the lattice based approaches previously suggested in that the data format is a much simpler data format. Therefore the storage savings are greater than for a lattice based equivalent and simple efficient dynamic programming searches can be used.

All of the embodiments and advantages of the first aspect of the invention are equally applicable to this aspect of the invention.

BRIEF DESCRIPTION OF THE DRAWING

The invention will now be described by way of example only with respect to the following drawings of which.

DETAILED DESCRIPTION OF THE INVENTION

The present invention relates to the processing of audio data containing speech to create phonetic index files to allow for the subsequent searching thereof. The steps involved in processing the data and the searching thereof are illustrated with respect to FIG. 1.

Figure 1:
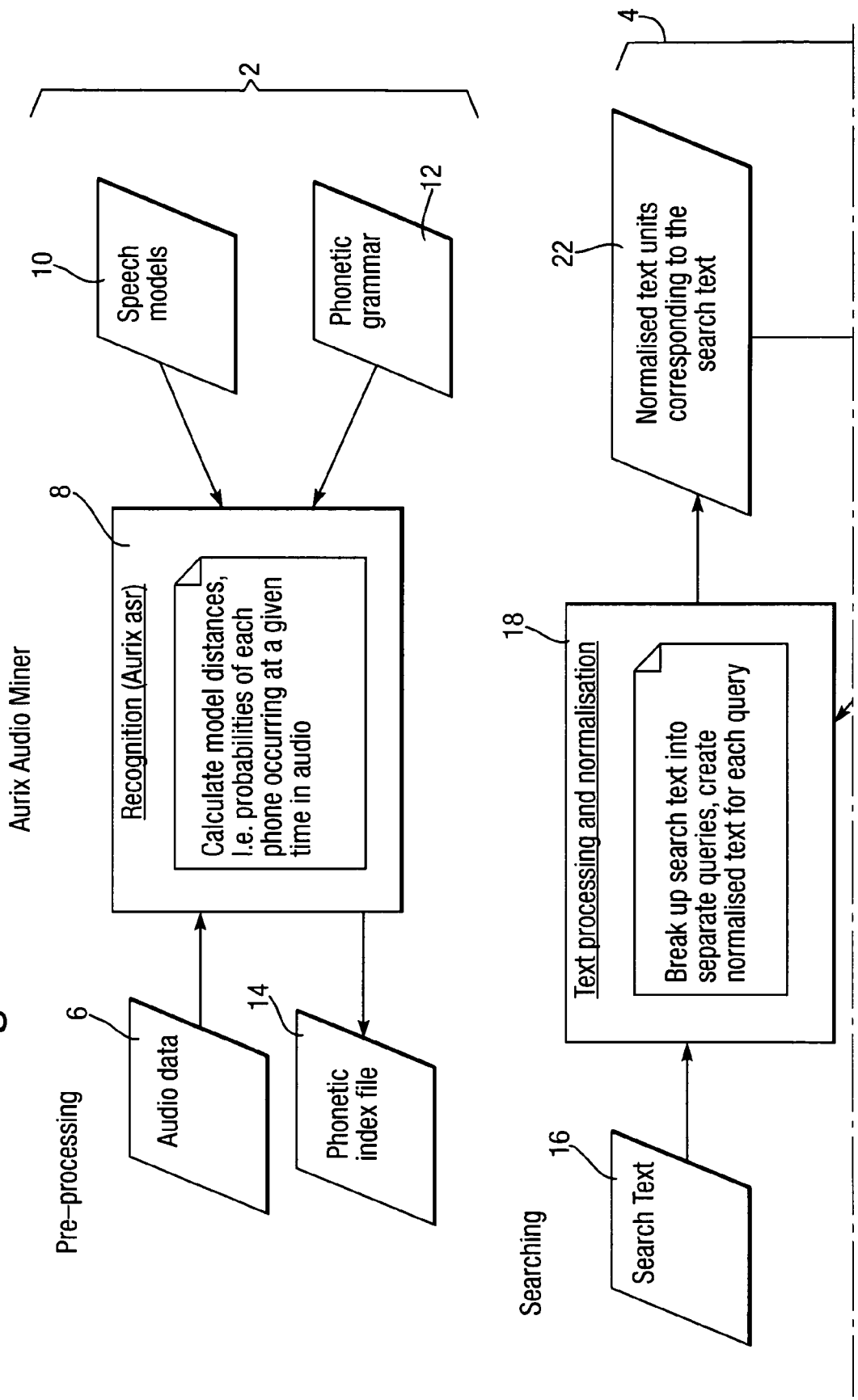
FIG. 1 illustrates the steps involved in creating and then searching phonetic index files according to the present invention.
Figure 1:
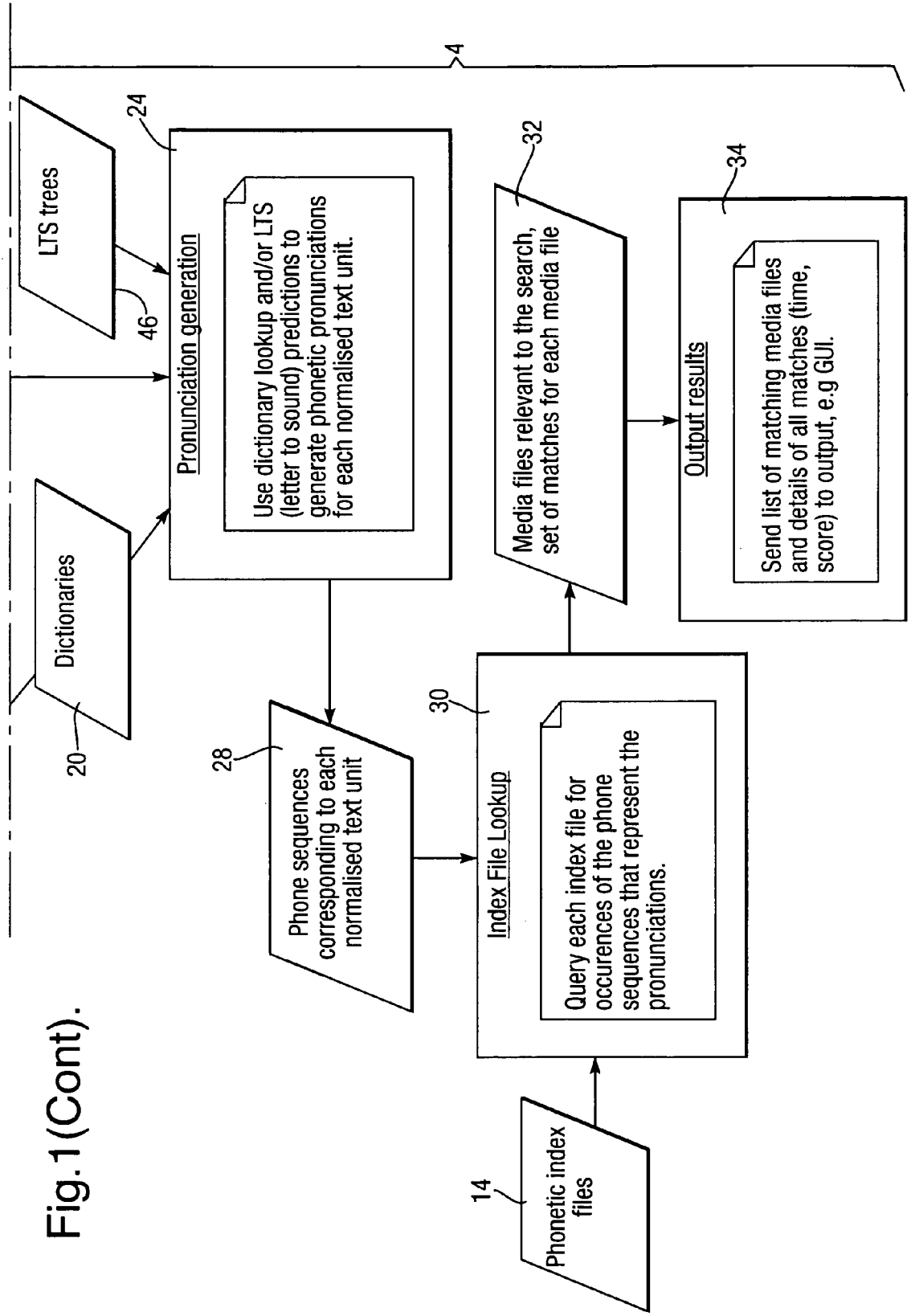

FIG. 1 illustrates the two distinct stages involved with the present invention, the initial processing stage 2 to generate a phonetic index file for some audio data and the search stage 4 to search for a search term.

The initial processing stage starts with some audio data 6. The audio data 6 may represent various forms of spoken audio and may be received in various ways. The audio may be being received in real time, for instance as live speech captured by a microphone, as a broadcast over a broadcast medium or as speech over a telephone network etc. or the audio data may be a pre-recorded audio data file. The audio data may be part of an audio-visual file. Usually the audio data will comprise digital audio data although it could be stored or received in analogue format and digitised prior to analysis.

The audio data 6 is processed by a phonetic recogniser 8. The phonetic recogniser is provided with phonetic models 10 which contain model details of a set of reference phones. The reference phones may be all the phones of a particular language or may be a set of phones from a plurality of languages. The phonetic recogniser 8 analyses frames of the audio data 6, typically at a rate of 100 frames per second, and for each frame compares the audio data with the phonetic models. Typically, the models will be hidden Markov models (HMMs) and will contain features related to the spectral content of the sounds they are associated with. One or more HMMs will represent each phone and durational characteristics of the phone are also modelled. The same features are calculated for the audio to allow the recogniser to determine the models that match the audio data most closely. The phonetic recogniser calculates model distances using all of the model features that typically relate to the frequency content of the signal. In some instances phonetic grammar rules 12 may also be used in determining the scores for each phone, i.e. rules relating to impossible or unlikely phone sequences. In general however information regarding all possible phones is stored and no hard choices are made regarding the sequence of phones and so the distances are generated purely based on how closely the audio matches the model.

Calculating model distances for phones in the audio data is known in the art of automatic speech recognition and the calculated distances, which effectively indicate how likely it is that a particular phone occurs at a given time in the audio, are generally used to decide on a particular word or sequence of words. For instance an open-source Java based speech recogniser, Sphinx-4, hosted by sourceforge.org, operates using a hidden Markov model (HMM) based acoustic model and determines scores for matches with particular words.

The initial output from the model may be modified to aid discrimination between phones later or other information may be used to set the final score.

Unlike known speech recognisers however the present invention is interested in the model distances for each modelled phone and the phonetic recogniser stores all the model distances, i.e. it effectively stores a score indicative of the probability of each phone appearing in the audio at each frame time, in a phonetic index file 14. For most recognisers the modelling is performed to identify the most likely word or word sequence and then it is just that word or sequence which is stored. The present invention lies partly however in the realisation that storing the model distances as a score in a phonetic index file 14 gives improved downstream searching capability without unduly limiting the search speed or unduly increasing the storage requirement. The skilled person would therefore be aware of how to implement a phonetic recogniser which is capable of matching input audio to each of a set of reference phone models and recording each of the model distances.

The phonetic index file 14 may be stored as a metadata file linked to the audio file.

The phonetic index file therefore effectively represents the audio as a series of discrete time segments, also known as frames and, for each frame, stores the probability of that audio segment being each one of the reference phones. In practice, it may be desirable to process the audio at a variable frame rate, so that distance scores need not be written out for every frame of the input. Hence, for each set of phone distance scores representing the phone probabilities for one frame of the audio, a frame count is also stored to specify the number of input audio frames which have been ignored before the next set of distance scores. By storing these frame counts it is simple to calculate the time reference in the audio file to which any set of distance scores corresponds.

As the information relating to the scores is effectively a matrix, i.e. a score for each of a set of p possible phones at each of a set of f frame times, the data file can have a simple matrix format. This not only has advantages for searching as will be described but also means compression techniques can be used on the data. The skilled person will be well aware of a number of compression techniques that can be used to reduce the data storage requirement for a computer readable file without actually throwing any data away.

The phonetic index file could also be used to store other information regarding the audio data. For instance, audio features could be calculated that allow speaker identities to be determined and these could be stored in the index file.

Data relating to other features of the audio or the phones, such as phone boundaries, could also be stored which may help at search time.

The audio data file with the phonetic index file as metadata can then be stored in an archive along with other similarly tagged audio data files until it is wished to perform a search.

The search stage typically starts with a user entering some search text 16 in a similar manner to usual text based database searching, e.g. internet search engines. The query can specify one or more words or phrases to search the audio data for. A text processor 18 breaks up the search text into separate queries as required and creates normalised text for each query. Alternatively, the query can be specified as a sequence of phone symbols, in which case the text normalisation and pronunciation generation stages are not carried out.

Depending on the information stored in the phonetic index files it may also be possible to add additional criteria to the search, for example only instances of words spoken by particular individuals, only data files created after a certain date, only news broadcasts by CNN etc.

The text normalisation stage will convert numerals, abbreviations and common symbols into words (e.g. "Dr Smith spent $10" becomes "Doctor Smith spent ten dollars") using one or more dictionaries 20 to determine which symbols and words are allowable. The output of this stage is a sequence of normalised text units for each query. The different normalised text units may have a weighting applied to favour more likely matches, for instance an input search term "5/1/2005" could be normalised several ways including "fifth of January two thousand and five" and "five one two thousand and five". The alternative normalisations could be weighted to indicate that the former is a more usual spoken form.

A pronunciation generator 24 then generates one or more phone sequences to search for based on the normalised text units. Each text unit may generate more than one possible phonetic search sequence to allow for different pronunciations of the search words, for instance to account for regional variations. The pronunciation generator uses a large dictionary of words 20 to generate the phonetic search sequences but it is not limited to only the words pre-programmed into the dictionary. For alphabet based written languages the pronunciation generator has letter-to-sound trees 26 that allow it to convert the search text into one or more phonetic search sequences if no entry for the search text exists in the dictionaries.

The pronunciation generator therefore generates a number of phonetic search sequences 28 corresponding to the normalised text units. These alternative pronunciations are likely to have some phones in common and so may be grouped into phone networks. For instance in English the word January has several pronunciations, all pronunciations having the same beginning and end. In this case a phone network representing all the pronunciations can be searched for. As used herein the term phone sequence shall include a reference to such a phone network of related pronunciations.

A dynamic programming (DP) search module 30 then queries each phonetic index file 14 which it is wished to search, subject to any other identified search criteria. Criteria which impose an absolute limit on the index files or parts thereof to be searched and which require less processing will generally be performed first to reduce overall processing time. When the relevant index files or parts thereof have been identified the DP search module 30 performs a DP search to identify likely occurrences of each phonetic search sequence based on the model distances stored in the phonetic index files.

Dynamic programming is a well established technique used in a variety of pattern matching applications. It provides a computationally efficient way to align two sequences of arbitrary length in a way that applies the optimum non-linear timescale distortion to achieve the best match at all points.

The skilled person, knowing the format of the scores in the phonetic index file and the simple data structure, could readily determine an appropriate DP algorithm to identify likely matches for the phonetic search sequences. The simple structure allows for computationally fast and efficient searches.

The search runs once only, working from the start to the end of the index file data in time order. It stores matches and scores as it progresses, then at the end applies scaling and thresholding to ensure all scores are in the 0-100 range.

The DP search module therefore can be used to identify, for each phonetic search sequence, occurrences of that particular phone sequence in the phonetic index files with a high likelihood of match. The particular score for each possible match is known and can be used to rank the results. The search module outputs a results list 32 identifying the possible match in the phonetic index file and the score for the possible match, the relevant audio file to which the match relates and the position of the possible match in the audio file.

The results are then processed and ranked, for instance taking account of different phonetic search sequences having been generated from the same search word and the search criteria, e.g. two separate words in the same audio file etc. and the results are displayed on a graphical user interface 34.

The display lists the most relevant hits first and gives an indication of the score for the hit, i.e. the degree of confidence in the match. The display can also give other details about the relevant audio file, for instance any title, data or content details. The display will also give a link to the relevant part of the audio file so that the user can play the relevant part of the audio file (or audio visual file if appropriate). In this way the user can quickly determine whether the hit is indeed relevant to their search.

The present invention therefore offers a data storage facility for audio data allowing for accurate open ended searching. The present invention has obvious application to the field of audio data mining such as may be used by information management services or broadcasters etc. However the invention could be used in a number of different applications. Indeed any application where audio data containing speech is stored and where these data may need to be searched later would benefit from the present invention.

The searchable data file produced by the method of the present invention may be stored as a metadata file linked to the original audio data file. It is usual that metadata contains a link to the file that it contains information about. In some formats however the audio data and searchable data file, i.e. index file, may be part of the same file. The present invention is particularly applicable to providing index files that would meet the requirements of the MPEG-7 data format which requires some kind of spoken content indexing for audio-visual data files.

The present invention lies partly in maintaining information regarding all possible phones when processing the audio data rather than rejecting information regarding some phones, such as in the known lattice based phonetic approach. As mentioned this allows a simple DP search to be used and increases accuracy.

The creation of a searchable data file and subsequent searching thereof using the methods of the present invention have been evaluated by measuring standard measures of accuracy percentage recall and false alarm rate. Percentage recall at ten false alarms per hour was chosen as the point on the graph at which to compare search accuracy. This measure looks for a known search term and analyses the hit list in order of decreasing confidence score to determine the percentage of instances of a search term in the audio which have been correctly identified in the results before ten false hits have been encountered for each hour of audio analysed.

English was the spoken language and the percentage recall/false alarm rate measured for different types of speech and for search terms of four different lengths roughly equivalent to one, two, three or four word searches. For TV/radio news audio (spontaneous speech, high quality) the percentage recall was 28-89% (28% for one word searches and 89% for four word searches) which indicates a good recall, especially for longer search sequences.

The same measure was also used to measure the accuracy of an approach producing a searchable data file of a lattice of the 20 best phone candidates. The accuracy of both approaches is dependent on implementation and any comparison should take this into account. For instance the number of phone candidates stored in the lattice and techniques used to address non-exact matches will have a major impact on performance of the lattice based approach. Nevertheless the methods of the present invention generally gave a substantially better percentage recall for all audio types and all search sequences. An overall increase in accuracy of between 25 and 190% (depending on the data type and search length) was observed.

It can therefore be seen that the method of the present invention can offer a significant improvement in accuracy over the conventional lattice based approach to creating and searching audio index files.

The present invention may be implemented in several different ways. In terms of producing an audio file with a phonetic index file, a standard personal computer could be provided with a phonetic recogniser and the appropriate phonetic models and phonetic grammar rule set and could process the audio data to produce the index file. Using a 1.5 GHz Pentium 4 machine, audio data can be processed at a speed of 3-6 times faster than real time (for a set of ~40 phones).

A dedicated audio database and search engine could be implemented for searching audio data. Thus a single device may be configured to receive input text, produce the phonetic search sequence and perform a search on phonetic index files—although the index files themselves may be stored elsewhere in one or more databases.

A 1.5 GHz Pentium 4 machine can search several thousand times faster than real time, e.g. for a 3 phone sequence, 1 hour's worth of audio can be searched in under a second. Search speed is roughly proportional to machine processor speed.

Depending upon the application however it may be more usual to separate out parts of the system. For instance a user may enter text at a home PC connected to the internet which would then transmit the search text to a server based audio search engine. Again the search engine may actually receive phonetic index files from a number of other data sources. The skilled person would appreciate that several options are possible within the remit of the invention.

The invention claimed is:

1. A method of indexing and searching both live audio data and prerecorded audio data, said method comprising the steps of:
   analyzing the audio data with a phonetic recognizer wherein the phonetic recognizer acts on frames of the audio data; and
   determining, for each of said frames and independently of the others of said frames, a score for each of a set of all reference phones of a language or dialect based on one or more features of said set of reference phones, the independently-determined score indicating the likelihood that said frame corresponds to said phone, wherein for each of said frames, the independently-determined score indicates a probability of each phone from the set of reference phones appearing in the audio data;
   generating index data for each of said frames corresponding to said independently-determined scores for each of said set of reference phones;
   forming said index data into a data stream directed to a search engine, said engine uses a dynamic programming method to combine said independently-determined scores with phone sequence information derived from a user inputted query for searching the audio data, thereby enabling said audio data to be indexed and searched only once and in sequence as a one pass search; and
   presenting search results from the audio data in response to the user query.

2. A method according to claim 1 wherein the phonetic recognizer determines an interim score for each phone in a particular audio frame and modifies the interim score for each phone based on the scores for the phones determined for one or more of the audio frames immediately preceding and/or following said particular frame.

3. A method according to claim 1 wherein the method includes the step of storing the data in a searchable data output store.

4. A method according to claim 3 wherein the stored data contains information about the relative position of at least some of the audio frames in the audio data.

5. A method according to claim 3 wherein the method includes the step of processing the audio to calculate features relevant to speaker identification and storing these features in the searchable data output store.

6. A method according to claim 5 wherein the method includes the step of storing time references along with the features relevant to speaker identification in the searchable data file.

7. A method of indexing and searching both live audio data and prerecorded audio data, said method comprising the steps of:
   analyzing the audio data with a phonetic recognizer wherein the phonetic recognizer acts on frames of the audio data and determining, for each of said frames and independently of the others of said frames, a score for each of a plurality of reference phones that comprise a complete set of phones of a particular language or dialect, based on one or more features corresponding to said plurality of reference phones, the independently-determined score indicating the likelihood that said frame corresponds to a specific phone of said reference phones and indicating a probability of each phone appearing in the audio data, wherein a searchable data file stores independently-determined scores for each said audio frame in a simple matrix format, and generating, for each of said audio frames, indexing data corresponding to the said independently-determined scores for a plurality of the phones;
   forming said index data into a data stream directed to a search engine, said engine using a dynamic programming method to combine said independently-determined scores with phone sequence information derived from a user inputted query, searched only once and in sequence as a one pass search; and
   presenting search results from the audio data in response to the user query.

8. A method according to claim 7 wherein the set of reference phones is a preselected sub-set of a larger database of phones.

9. A method according to claim 8 wherein the method comprises the step of using a language recogniser to identify the language/dialect being spoken in the audio data and select an appropriate sub-set of phones as the reference phone set.

10. A method of searching both live audio data and prerecorded audio data for a phonetic search sequence, said method comprising the steps of;
   (i) directing a data stream to a search engine, said data stream comprising index data for each of a plurality of audio frames and independently of the other frames, said index data corresponding to the likelihood of a match for a plurality of reference phones that comprise a complete set of phones of a particular language or dialect to a user inputted query for searching the audio data;
   ii) searching said data stream to find likely matches to a phonetic search sequence in response to the user inputted query, using a dynamic programming method wherein frame-independent scores for the reference phones contained in the data stream, based on one or more features of the reference phones, for each audio frame are used to determine the likely matches using the indexed data searched only once and in sequence as a one pass search, wherein for each audio frame, each frame independent score indicates a probability of each phone from the complete set of reference phones appearing in the input data and presenting search results from the audio data in response to the user query.

11. A method as claimed in claim 10 comprising the step of determining at least one phonetic search sequence from a defined search term.

12. A method as claimed in claim 11 wherein the method comprises the step of converting a text search term into one or more phonetic search sequences using a processor.

13. A method as claimed in claim 12 wherein the processor uses letter-to-sound trees and/or phonetic dictionaries to create the one or more search phonetic sequences.

14. A method as claimed in claim 11 wherein the search term is supplied as audio data and wherein the method comprises the step of using a phonetic recogniser/ speech recogniser to determine the phonetic search sequence.

15. An apparatus for acting on live audio data and prerecorded audio data to create a searchable data file comprising:
 a complete reference set of phones of a particular language or dialect having one or more features corresponding thereto;
 a phonetic recognizer, implemented by a processor, adapted to compare a frame of audio data with the reference set of phones based on said one or more features and to output a score indicative of the likelihood that said frame corresponds to each phone for each of said frames and independently of the other said frames, wherein each score indicates a probability of each phone appearing in the audio data;
 a data output store for creating a searchable data file comprising, for each audio frame, the frame-independent score for each of the set of reference phones, said data output store directing the searchable data file to a search engine, said engine using a dynamic programming method to combine said frame-independent scores with phone sequence information derived from a user inputted query for searching the audio data, thereby enabling said audio data to be searched only once and in sequence as a one pass search; and
 a display for presenting search results from the audio data in response to the user query.

16. An apparatus for acting on live audio data and prerecorded audio data to create a searchable data file comprising:
 a reference set of phones having one or more features corresponding thereto;
 a phonetic recogniser adapted to compare a frame of audio data with the reference set of phones based on said one or more features and to output a score indicative of the likelihood that said frame corresponds to each phone for each of said frames and independently of the other said frames, wherein each score indicates a probability of each phone appearing in the audio data; and
 a data output store for creating a searchable data file comprising, for each audio frame, the frame-independent score for each of the set of reference phones, said data output store directing the searchable data file to a search engine, said engine using a dynamic programming method to combine said frame-independent scores with model connectivity information derived from the search term thereby enabling said audio data to be searched only once and in sequence as a one pass search.

* * * * *